United States Patent
Kazkaz et al.

(10) Patent No.: US 6,634,229 B1
(45) Date of Patent: Oct. 21, 2003

(54) RESISTIVE FLUID LEVEL SENSING AND CONTROL SYSTEM

(75) Inventors: Ghaffar Kazkaz, Rolling Meadows, IL (US); Richard C. Francke, Bartlett Lakes Estates, IL (US); Bradley S. Beiermann, Libertyville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/441,309

(22) Filed: Nov. 16, 1999

(51) Int. Cl.⁷ .............................................. G01F 23/24
(52) U.S. Cl. .................... 73/304 R; 73/290 R; 340/620
(58) Field of Search ........................ 73/304 R, 304 C, 73/290 R; 338/92, 94, 28; 340/620

(56) References Cited

U.S. PATENT DOCUMENTS

| | | | |
|---|---|---|---|
| 3,667,296 A | | 6/1972 | Schiefer et al. |
| 3,876,967 A | * | 4/1975 | Hehl et al. ................... 338/126 |
| 4,146,322 A | * | 3/1979 | Shimizu et al. ............. 354/234 |
| 4,169,377 A | | 10/1979 | Scheib |
| 4,425,795 A | * | 1/1984 | Albrecht et al. ............... 73/295 |
| 4,462,249 A | * | 7/1984 | Adams ....................... 73/40.5 |
| 4,497,205 A | * | 2/1985 | Zulauf et al. .................. 73/313 |
| 5,083,460 A | | 1/1992 | Kumada et al. |
| 5,138,881 A | * | 8/1992 | Riley et al. ................ 73/304 R |
| 5,142,909 A | * | 9/1992 | Baughman ................. 73/304 C |
| 5,148,708 A | * | 9/1992 | Murata et al. ............. 73/304 R |
| 5,226,313 A | | 7/1993 | Murata et al. |
| 5,263,370 A | * | 11/1993 | Murata et al. ................. 73/226 |
| 5,501,102 A | | 3/1996 | Williamson |
| 5,603,238 A | | 2/1997 | Williamson |
| 5,626,053 A | * | 5/1997 | Williamson ............... 73/304 R |
| 5,743,136 A | * | 4/1998 | Gaston et al. ................. 73/313 |

* cited by examiner

*Primary Examiner*—Hezron Williams
*Assistant Examiner*—Rodney Frank
(74) *Attorney, Agent, or Firm*—Mark W. Croll; Paul F. Donovan (57) ABSTRACT

A fluid level sensing systems including a resistive element having an upper end portion disposed in an upper portion of a container and a lower end portion disposed in a lower portion of the container. The resistance of the resistive element varies between the upper and the lower portions of the container. An at least partially conductive strip having substantially the same length as the resistive element is disposed in the container generally parallel thereto and at approximately the same level in the container as the resistive element. An input signal source is coupled to the resistive element by a series resistor.

30 Claims, 4 Drawing Sheets

RESISTIVE FLUID LEVEL SENSING AND CONTROL SYSTEM

REFERENCE TO RELATED APPLICATION

The present application is related to U.S. application Ser. No. 09/090,439 filed on Jun. 4, 1998, entitled "Resistive Fluid Level Sensing and Control System", assigned commonly herewith and incorporated by reference herein.

BACKGROUND OF THE INVENTION

The invention relates generally to non-floating fluid level sensors, and more particularly to electrical systems for sensing and controlling fluid levels in containers.

Electrically resistive fluid level sensors are known generally for measuring conductive and partially conductive fluid levels and provide many advantages over floating mechanical sensors, including the substantial elimination of corrosion susceptible parts, reduced cost, and improved accuracy and reliability.

The referenced application Ser. No. 09/090,439 entitled "Resistive Fluid Level Sensing and Control System" discloses fluid level sensors comprising generally a pair of carbon or polymeric resistive film elements disposed in a container, for example in a washing machine basin. The conductive or partially conductive fluid in the container provides a relatively low resistance, or short circuit, path between the resistive elements, thus forming a series connection therebetween. The resistance of the resistive elements varies continuously in proportion to the changing fluid level in the container. A corresponding change in a voltage output measured across the series resistive elements is indicative of the fluid level in the container, and in the exemplary washing machine application the output voltage is used to control the supply of fluid thereto. See also U.S. Pat. No. 5,083,460 entitled "Level Sensor".

U.S. Pat. No. 4,169,377 entitled "Quantity Sensing System For A Container" discloses a level sensing system having a pair of series connected resistive elements disposed in a flowable material so that the resistance thereof varies discretely in some proportion to the changing material level. The resistive elements each include a resistive strip that is electrically isolated from the flowable material. Each strip has a plurality of electrodes disposed thereon in spaced apart relation and in electrical contact with the flowable material, thus providing discrete changes in the resistance of the resistive elements with the changing material level.

U.S. Pat. No. 5,626,053 entitled "Floatless Gauge With Resistive/Conductive Polymer" discloses a single elongate resistive member disposed into an electrically grounded fluid tank. The resistive member has a non-uniform cross-section along its vertical length corresponding to variations in the cross-section of the tank to compensate for variations in the distance between the resistive element and the electrically grounded tank side wall.

The present invention is drawn toward advancements in the art of fluid level sensing, and more particularly to resistive fluid level sensors and systems.

An object of the present invention is to provide novel resistive fluid level sensors and systems that are economical and that overcome problems in the art.

Another object of the invention is to provide novel resistive fluid level sensors and systems that are accurate and reliable.

Another object of the invention is to provide novel resistive fluid level sensors and systems that are fail safe.

It is also an object of the invention to provide novel resistive fluid level sensors and systems that sense changing fluid levels continuously.

Another object of the invention is to provide novel resistive fluid level sensors and systems that sense changing fluid levels discretely.

A further object of the invention is to provide novel resistive fluid level sensors and systems for sensing fluid levels in containers, for example washing machine basins, and for terminating the supply of fluid thereto when the fluid level therein reaches a specified level.

Yet another object of the invention is to provide novel resistive fluid level sensors and systems for sensing fluid levels in containers that are electrically grounded, for example some washing machine basins.

A more particular object of the invention is to provide novel fluid level sensing systems comprising generally a resistive element having an upper end portion disposed in an upper portion of a container and a lower end portion disposed in a lower portion of the container, wherein the electrical resistance per unit length of the resistive element varies between the upper and the lower portions of the container. The system also comprises a conductive or partially conductive strip having substantially the same length as the resistive element. The strip is disposed in the container generally parallel to the resistive element and at approximately the same level in the container as the resistive element.

Another more particular object of the invention is to provide novel fluid level sensing systems comprising generally a resistive element having an upper end portion disposed in an upper portion of a container and a lower end portion disposed in a lower portion of the container, wherein an electrical resistance per unit length of the resistive element increases toward the lower portion of the container and decreases toward the upper portion thereof. The system also comprises a conductive or partially conductive strip having substantially the same length as the resistive element. The strip is disposed in the container generally parallel to the resistive element and at approximately the same level thereof in the container.

Yet another object of the invention is to provide novel fluid level sensing resistive elements comprising generally an electrically insulated semi-conductive film strip comprising a plurality of discrete strip portions deposited onto a non-conductive substrate. Each of the discrete strip portions of the resistive element has a corresponding width dimension, wherein the width dimensions toward a first end portion of the non-conductive substrate are wider than the width dimensions toward an opposite second end portion thereof. A plurality of electrodes are disposed in spaced apart relation on the non-conductive substrate and coupled to a corresponding one of the discrete strip portions of the resistive element.

Still another object of the invention is to provide novel fluid level sensing resistive elements comprising generally an electrically insulated semi-conductive film strip deposited onto a non-conductive substrate, the semi-conductive film strip having a width dimension with a continuously narrowing taper between first and second end portions thereof, the first end portion of the semi-conductive film strip having a wider width dimension than the second end portion thereof.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
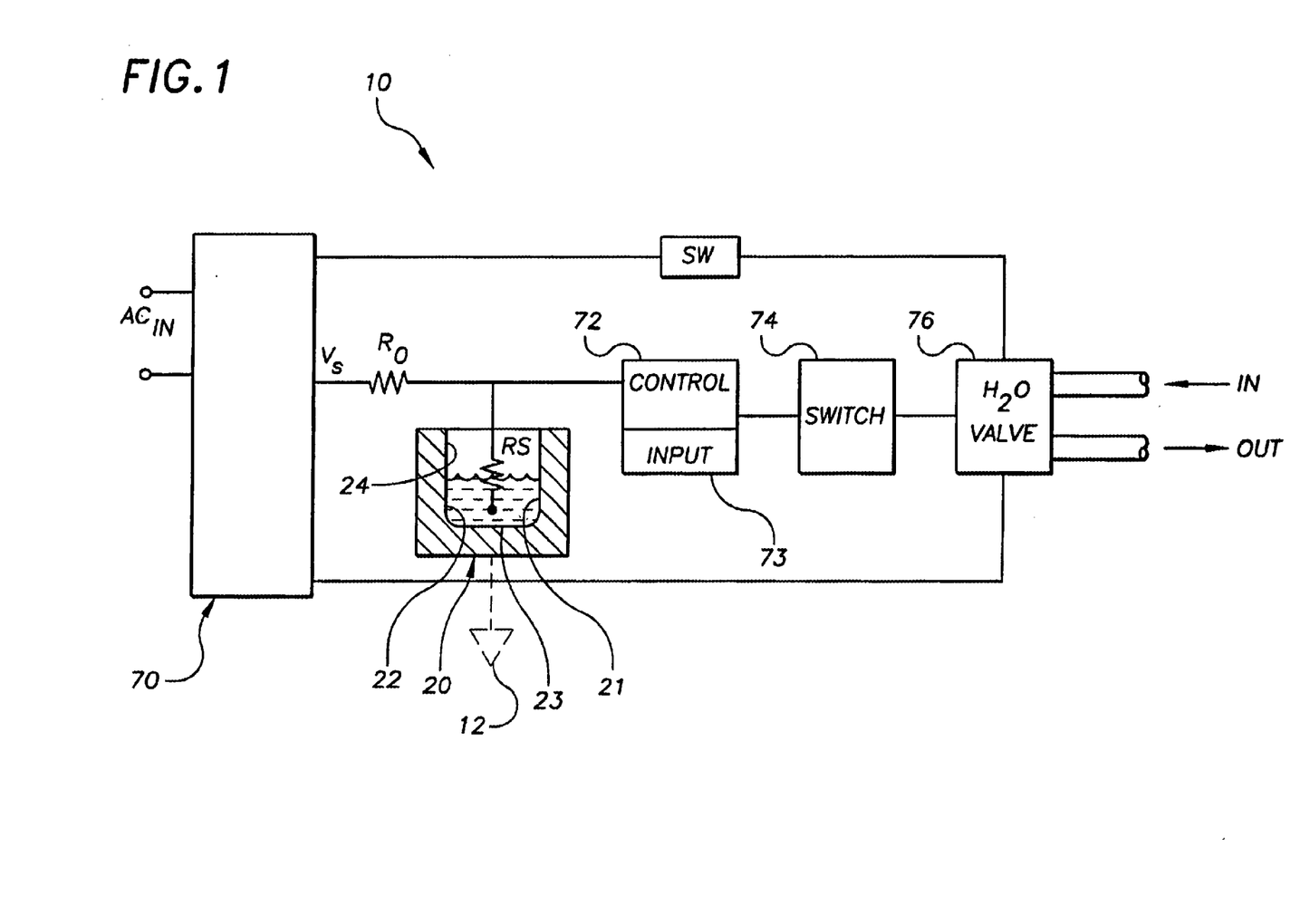
FIG. 1 is a fluid level sensing and control system according to an exemplary embodiment of the present invention.

FIG. 1 is a fluid level sensing and control system 10 comprising generally a fluid level sensing system portion for sensing the level of conductive or at least partially conductive fluids in a container 20, and a control system portion for controlling the supply of fluid thereto based on signals provided by the fluid level sensing portion.

In one exemplary application of the invention, the container 20 is a washing machine basin, and the system 10 senses water level therein and discontinues a supply of water thereto upon sensing a specified water level in the container, as discussed further below. The system 10 may be used more generally in any application where it is desirable to sense or detect, and in some embodiments to control, fluid level in a container.

The container 20 has generally a lower portion 22 and an upper portion 24, and in the exemplary washing machine basin application the container has a substantially constant cross-section between the upper and lower portions thereof. In other containers, the upper and/or lower portions thereof do not have a strictly constant cross-section, for example where the container is contoured between a side portion 21 and a bottom 23 end thereof. Other containers may have a tapered upper neck or cover portion extending from the upper side portion thereof. In other embodiments, the container may have any cross-sectional shape.

The fluid level sensing system portion comprises generally a resistive element disposed in the container, wherein an upper end portion of the resistive element is disposed in the upper portion of the container and a lower end portion of the resistive element is disposed in the lower portion of the container. In most applications, the resistive element is preferably disposed vertically in the container.

Generally, an input signal is applied to the resistive element disposed in the fluid container. An output signal across the resistive element varies with the changing fluid level in the container, and is indicative of the fluid level therein, as discussed further below.

In the exemplary embodiment of FIG. 1, for example, an input voltage signal Vs is applied to the resistive element Rs through a series resistor R0 having a first end portion coupled to the upper end portion of the resistive element, as illustrated. In FIG. 1, there is only a single resistive element Rs is disposed in the container 20, and the container is electrically grounded, as indicated by the phantom ground symbol 12. The output signal is measured across the resistor Rs between the upper portion thereof and electrical ground.

In other embodiments, there is no series resistor. In some other embodiments, the container is not electrically grounded, and there are two similar resistive elements disposed side by side in the container in an electrical series configuration.

The resistance per unit length of the one or more resistive elements preferably varies between the upper and the lower portions of the container. Varying the resistance of the resistive element between the upper and the lower portions of the container is useful to compensate for resistance tolerance variations in the resistive element. Varying the resistance may also be used to compensate for environmental variations that adversely affect the system.

In one embodiment, the resistance per unit length of the resistive element increases toward the lower end portion of the resistive element and decreases toward the upper end portion thereof. Thus in the embodiment of FIG. 1, the resistance of the resistive element Rs increases toward the lower portion of the container and decreases toward the upper portion thereof. Varying the resistance per unit length of the resistive element Rs in this exemplary manner provides a more linear relationship between the output voltage signal across the resistive element Rs and the fluid level in the container. In other embodiments however the resistance per unit length of the resistive element Rs may be varied to provide some other nonlinear relationship, depending on the requirements of the particular application.

In one embodiment, the resistance per unit length of the resistive element varies continuously between the upper and lower end portions thereof. In the exemplary embodiment of FIG. 2, for example, the resistive element is a semi-conductive film strip 32 deposited onto a non-conductive substrate 34. The semi-conductive film strip 32 has a width dimension with a continuously narrowing taper between an upper end portion 31 and a lower end portion 33 thereof, wherein the upper portions of the film strip have a wider width dimension than the lower portions thereof.

Figures 2, 3:
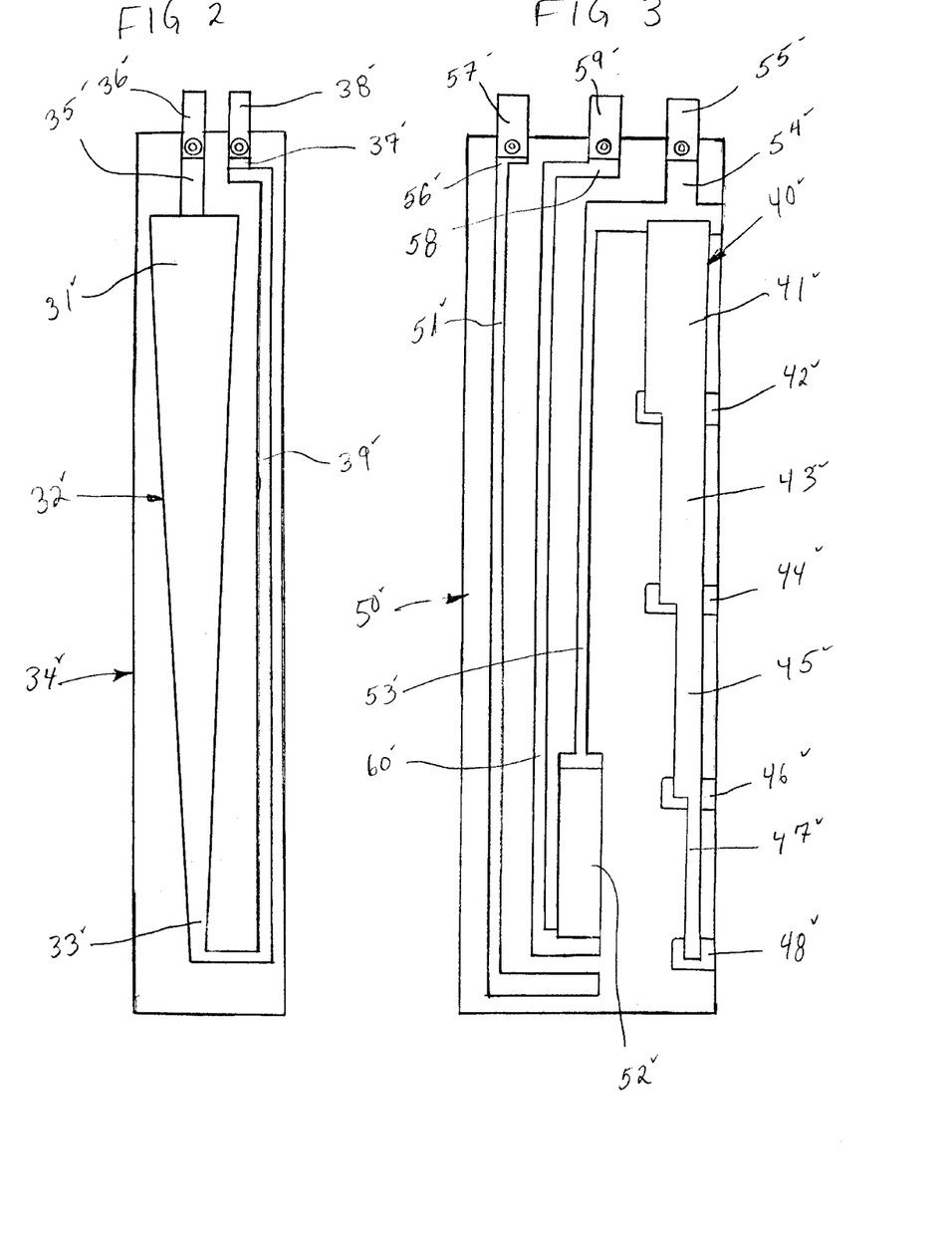
FIG. 2 is an exemplary elongated resistive film element for continuously measuring fluid level changes.
FIG. 3 is an exemplary elongated resistive film element for discretely measuring fluid level changes.
Figure 2:
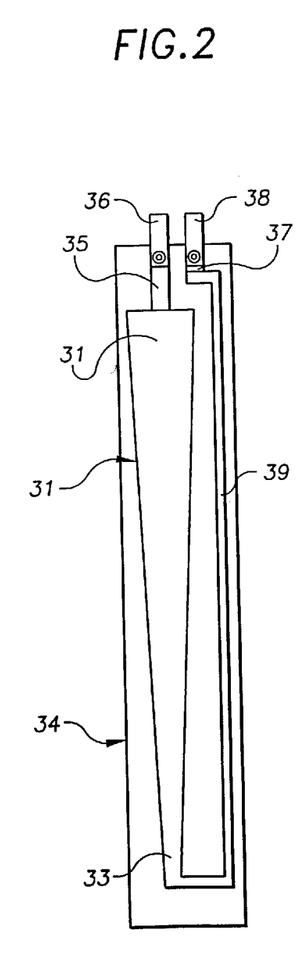
Figure 3:
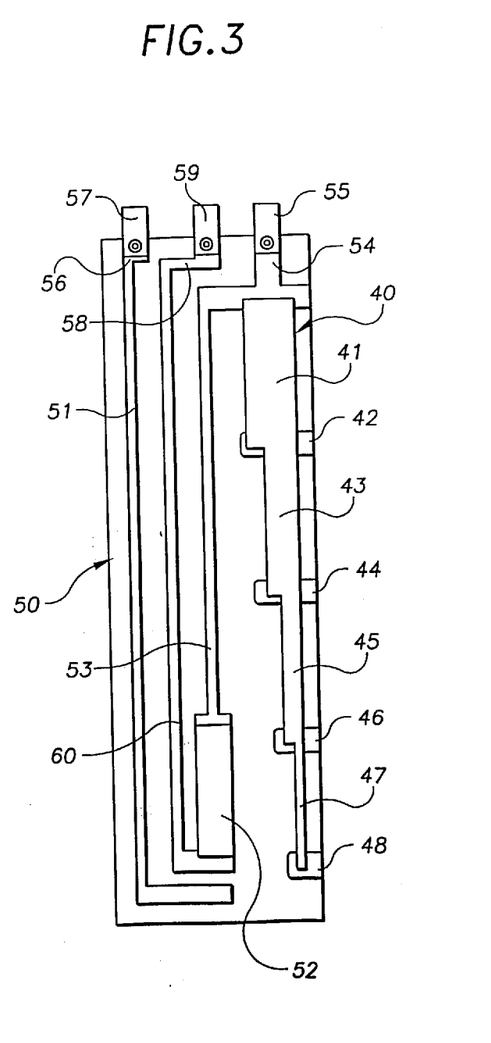

In the exemplary embodiment of FIG. 2, first and second electrical contacts 35 and 37 are disposed on an upper portion of the non-conductive substrate 34 proximate an upper portion of the film strip 32. The first and second electrical contacts 35 and 37 are preferably conductive materials deposited onto the non-conductive substrate 34. The first electrical contact 35 is coupled directly to the upper end of the film strip 32, and the second electrical contact 37 is coupled to the lower end of the film strip by another conductive or partially conductive strip 39, which may be formed of the same conductive material as the contact 37 or of the same material as the semi-conductive film strip 32.

The conductive or semi-conductive strip 39 is disposed generally parallel to the semi-conductive strip 32. The strip 39 also has approximately the same length as the semi-conductive strip 32 and is positioned at approximately the same level on the non-conductive substrate 34. In the exemplary embodiment, the strip 39 is coupled directly to the lower end of the semi-conductive film strip 32, but such a direct coupling is not required since the conductive or partially fluid in the container will provide a conductive path therebetween at different levels depending on the fluid level in the container.

In one exemplary fluid level sensing system configuration, the resistive element 32 of FIG. 2 is disposed vertically in the container and an input signal is applied to the upper end of the film strip 32, for example through the series resistor R0 in FIG. 1 coupled to the first contact 35 on the non-conductive substrate 34. In one exemplary circuit configuration typical of some washing machine applications, the second contact 37 is coupled to electrical ground.

In operation, as the fluid level in the container changes, portions of the film semi-conductive strip 32 are short circuited to electrical ground by fluid contacting the semi-conductive strip 32 and the electrically grounded strip 39. The output signal across the resistive element is measured between the contacts 35 and 37. Since the grounded strip 39 is generally parallel to the semi-conductive strip 32 and at the same level thereof, variations in the cross-section of the container do not substantially affect the resistance measured across the contacts 35 and 37, and thus do not adversely affect the output signal.

The output signal across the film strip 32 and more particularly between the contacts 35 and 37 varies in some continuous proportion to the fluid level in the container. The tapering width dimension of the film strip 32 is preferably selected so that the output signal across the film strip varies substantially linearly with the changing fluid level in the container. The particular tapering width dimensions of the semi-conductive film strip 32 depends generally on the particular electrical circuit configuration and may be determined readily either by calculation or by trial and error by those of ordinary skill in the art without undue experimentation. The continuously variable output signal may be used to indicate and in some applications to control the fluid level in the container, as discussed further below.

In another embodiment, the resistance per unit length of the resistive element varies discretely between the upper and lower end portions thereof. In one configuration, a plurality of electrodes are disposed on the resistive element in spaced apart relation between the upper and lower end portions thereof. Each of the plurality of electrodes is preferably coupled to a corresponding portion of the resistive element having a different resistance. The resistive element is electrically insulated from the fluid but the electrodes are exposed thereto.

In the exemplary embodiment of FIG. 3, the resistive element is a semi-conductive film strip 40 deposited onto a non-conductive substrate 50. The film strip 40 comprises a plurality of discrete strip portions 41, 43, 45, and 47 each having a corresponding width dimension that decreases between the upper and lower portions thereof. The semi-conductive film strip 40 is electrically insulated from the fluid, for example by covering the film strip 40 with another non-conductive substrate not shown in the drawing.

In FIG. 3, the plurality of electrodes is a corresponding plurality of conductive film portions 42, 44, 46 and 48 deposited onto the non-conductive substrate 50 and coupled to a corresponding discrete strip portion 41, 43, 45 and 47. In other embodiments, the film strip 40 may have more or less discrete strip portions and corresponding electrodes. Preferably, only the electrodes are exposed to the fluid in the container, but in some embodiments the semi-conductive strip 40 may also be exposed.

In FIG. 3, a series resistor is also formed as a second semi-conductive film strip 52 deposited onto the non-conductive substrate 50. The second semi-conductive film strip 52 is electrically insulated from the fluid and has a first end portion coupled to the first end portion of the first semi-conductive film strip 40 by a conductive film strip 53 deposited onto the non-conductive substrate 50. The conductive film strip 53 is also electrically insulated from the fluid. The second semi-conductive film strip 52 in FIG. 3 is optional and corresponds to the series resistor R0 in FIG. 1. In other embodiments, the series resistor may be separate from the non-conductive substrate, and in other embodiments the series resistor is not required.

In the exemplary embodiment of FIG. 3, first and second electrical contacts 54 and 56 are disposed on an upper portion of the non-conductive substrate 50 proximate an upper portion of the film strip 40. The first electrical contact 54 is coupled directly to the upper end of the film strip 40, and the second electrical contact 56 is coupled to another film strip 51 formed of the same conductive material as the contact 56 or of a semi-conductive material. The film strip 51 extends between the upper and lower portions of the non-conductive substrate generally parallel to the film strip 40 and at the same level thereof. Alternatively, the film strip 51 may be coupled to the lower portion of the resistive element 40 as in the embodiment of FIG. 2.

The exemplary embodiment of FIG. 3 also includes a third electrical contact 58 disposed on the upper portion of the non-conductive substrate 50. The third contact 58 is coupled to the second end of the series resistive film strip 52 by a conductive strip 60, which is also preferably insulated from the fluid.

In another exemplary fluid level sensing system configuration, the resistive element of FIG. 3 is disposed substantially vertically in a fluid container and an input signal is applied to the upper end of the film strip 40, for example by coupling the input signal source to the third contact 58 so that the input signal is applied through the series resistor 52. In one exemplary circuit configuration suitable for applications where the washing machine is electrically grounded, the second contact 56 is coupled to electrical ground.

In operation, as the fluid level in the container changes, portions of the film strip 40 are discretely short circuited to electrical ground by fluid contacting one or more electrodes and the electrically grounded strip 51, which is also exposed to the fluid. The output signal across the resistive element is measured between or across the contacts 54 and 56. Since fluid in the container only contacts the electrodes 42, 44, 46 and 48 and the grounded strip 51, the output signal across the semi-conductive resistive element 40 only changes when the fluid level in the container changes by an amount corresponding to the distance between adjacent electrodes.

The number of discrete fluid levels detectable by the resistive element correspond to the number of electrodes on the semi-conductive film strip 40. Also, since the grounded strip 51 is generally parallel to the semi-conductive strip 40 and at the approximately the same level thereof in the container, variations in the cross-section of the container do not substantially affect the resistance measured across the contacts 54 and 56, and thus do not adversely affect the output signal.

As noted above, the semi-conductive film strip 40 comprises a plurality of discrete portions each having a corresponding width dimension. In the exemplary embodiment, the width dimensions of the discrete film portions 41, 43, 45 and 47 are selected so that the output signal across the semi-conductive film strip varies substantially linearly with the changing fluid level in the container. The particular width dimensions of the discrete film portions depends generally on the particular electrical circuit configuration and may be determined readily, depending on the desired relationship between the input and output signals, either by calculation or by trial and error by those of ordinary skill in the art without undue experimentation. The output signal across the resistive element may thus be used to indicate and in some applications to control the fluid level in the container, as discussed below.

The variable resistive elements and more particularly the exemplary semi-conductive strips 32 and 40 of FIGS. 2 and 3, respectively, are two dimensional thin film resistors having a relatively constant film thickness formed on non-conductive substrates. In other alternative embodiments, however, the variable resistive elements may be formed as three dimensional resistive elements having variations in thickness along a third dimension.

The non-conductive substrates of FIGS. 2 and 3 may be formed of a polyester material or some other electrically insulating fluid resistant material, which is tolerant of the environmental conditions within the container in embodiments where it is exposed thereto. The semi-conductive resistive strips may be formed of carbon or polymer or polyester base materials, or other known resistive materials suitable for deposition on non-conductive substrates. The conductive electrodes and contacts are formed of a tin or silver paste, or some other relatively conductive material that may also be deposited onto non-conductive substrates.

In one exemplary application, the resistive strips 32 and 40 have an electrical resistance of approximately 100,000 ohms along the entire length between the upper and lower ends thereof. In applications where a series resistance is employed, the resistance of the resistive element Rs is preferably approximately two times greater than the resistance of the series resistor R0. The exemplary resistive values and relationships disclosed however may be more or less depending on the particular application and are not intended to limit the invention.

The non-conductive substrates 34 and 50 may include an adhesive on one side thereof for mounting onto an interior side wall 21 of the container. Alternatively, the semi-conductive strips 32 and 40 may be mounted directly to the interior surface of the fluid container 20 provided that the strips are electrically insulated from any conductive surface thereof.

FIG. 2 illustrates first and second conductive electrical connectors 36 and 38 coupled to the first and second electrical contacts 35 and 37, respectively. Similarly, FIG. 3 illustrates first, second and third electrical connectors 55,57 and 59 coupled to corresponding one of the first, second and third contacts 54, 56 and 58.

The electrical connectors may be coupled to the corresponding contacts and to the non-conductive substrates by conductive rivets or other known fasteners. The exemplary electrode connectors are configured as blade members for coupling to mating electrical receptacles of the circuit. In other embodiments the connectors may be configured differently.

Preferably, at least two electrical contacts are disposed in the container proximate the upper end portion of the resistive element. The first electrical contact is coupled to the upper end portion of the resistive element and the second electrical contact is coupled to a lower portion thereof or to electrical ground. When the fluid level in the container reaches the level of the first and second contacts, the output signal across the resistive element is relatively low, since the resistive film element is effectively short circuited by the fluid in the container. In the exemplary washing machine application, the relatively low output signal may be used to control and more particularly to turn off the water supplied to the container, thus preventing overfilling thereof.

In the exemplary embodiment of FIG. 2, the conductive contacts 35 and 37 and/or the corresponding electrical connectors 36 and 38 preferably remain exposed to fluid in the container and thus provide a short circuit path therebetween when coupled by fluid in the container, thereby producing a relatively low output signal across the resistive element 32. Similarly, in FIG. 3, the conductive contacts 54 and 56 and/or corresponding electrical connectors 55 and 57 remain exposed to fluid in the container to permit a short circuit path that produces a relatively low output signal across the resistive element 40. These low output signals may be used to control the fluid supplied to the container as discussed above.

In FIG. 1, an input signal source 70 is electrically coupled to the resistive element Rs through the series resistor R0. In one embodiment, the input signal source produces an alternating voltage source that applies for example an alternating 5 volt signal Vs to the first resistive element Rs. Alternatively, the input signal source may be a DC voltage source that applies a DC voltage signal to the resistive element Rs. In applications where the accumulation of minerals or other deposits on the resistive element Rs is problematic, however, the alternating input signal source is preferred.

The input signal source 70 may include a transformer that steps down an alternating input power supply voltage ACin. Where a DC signal is desired, a diode bridge may be coupled to the stepped-down voltage side of the transformer to generate a DC voltage signal, which may be filtered and regulated before application to the resistive element Rs. In other embodiments, other input signal sources may be used.

In some applications, it is desirable to utilize the fluid level sensor and more particularly the variable output across the resistive element Rs thereof for control. In the exemplary washing machine application, for example, the variable output signal may control the supply of water to the washing machine basin.

In FIG. 1, the variable output across the resistive element Rs is input to a control device 72 which controls a switch 74, for example a solenoid, that closes a water valve 76, which is controlled or opened initially by a primary switch SW. The control device 72 may include an input 73, for example to select the desired water level in the container. The variable output across the resistive element Rs may thus be compared by the control device 72 to a selected input thereof to operate the switch 74, thereby controlling the water valve 76.

Figure 4:
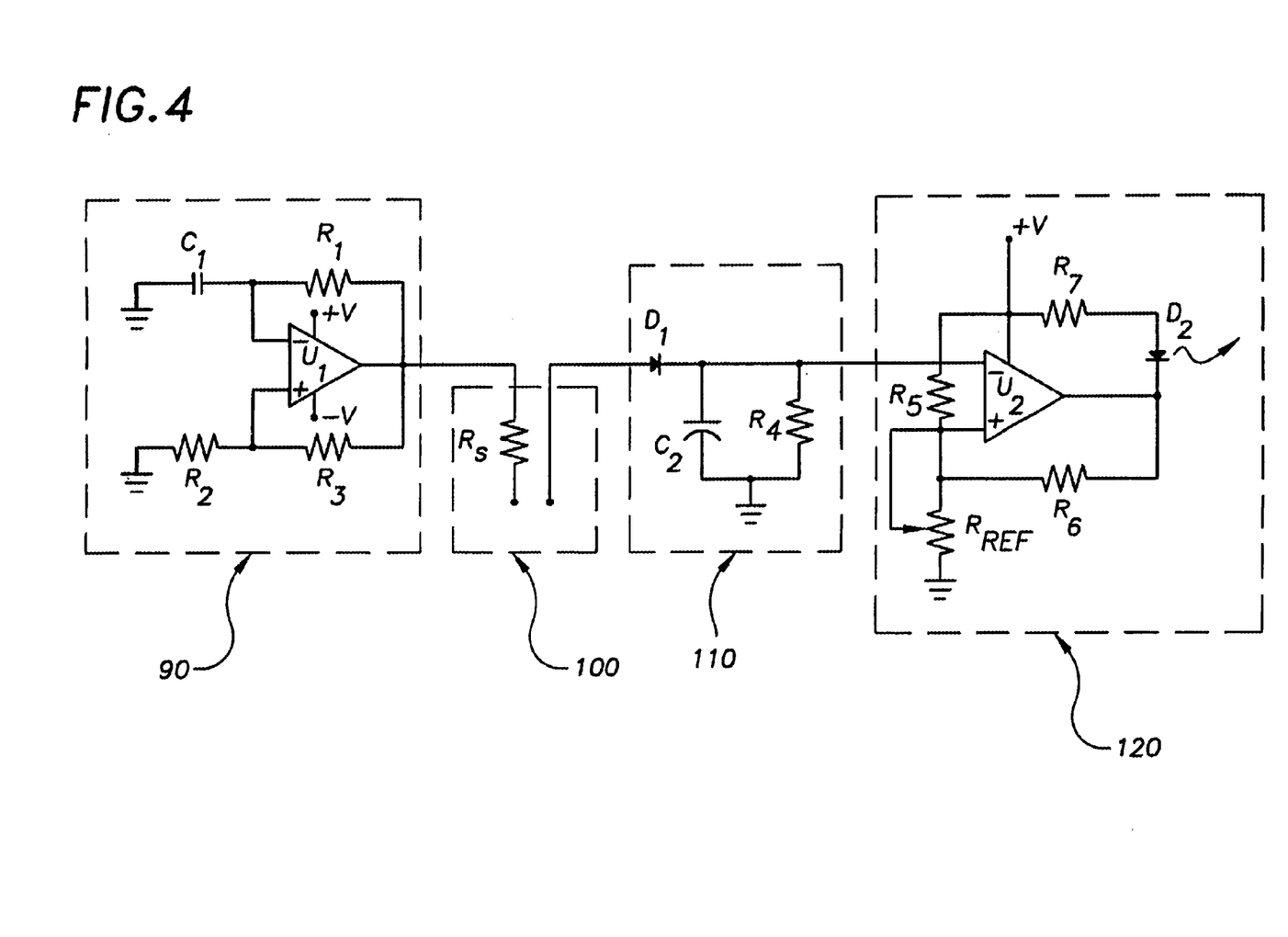
FIG. 4 is an exemplary fluid level sensing and control system having an alternating input voltage.

The exemplary system of FIG. 4 comprises an alternating input signal circuit 90 coupled to a fluid level resistive element circuit 100 coupled in turn to a converter circuit 110, which is coupled to a comparator circuit 120 having a changing output that may be used to control some other device.

In FIG. 4, the exemplary alternating input signal circuit 90 is a square wave oscillator comprising generally an op-amp U1 having positive and negative voltage supplies indicated as +V and −V. R2 and R3 establish a reference input signal at the positive input of the op-amp U1. The capacitor C1 charges through resistor R1, and thereafter the capacitor C1 discharges generating a generally triangular signal at the negative input of the op-amp U1. The output of the op-amp U1 is an oscillating square wave with positive and negative polarities. In other embodiments, other alternating input signal circuits may be used.

In FIG. 4, the input signal from the input signal circuit 90 is applied to the resistive element circuit 100. In one embodiment, the resistive element circuit 100 includes a single resistive element Rs disposed in the fluid container, for example one of the exemplary resistive elements of FIGS. 2 and 3. Other alternative embodiments may include parallel resistive elements disposed in the fluid container.

The resistive element Rs preferably has a resistance that varies between the upper and lower portions thereof as discussed above.

In FIG. 4, the alternating output across the resistive element Rs is applied to the converter circuit 110, which comprises generally a rectifying diode D1 and filtering capacitor C2 connected in parallel with a dissipating resistor R4. The converter circuit converts the alternating signal to a DC signal. In other embodiments, alternative converter circuits may be employed to rectify the output across the resistive element circuit 100.

In FIG. 4, the rectified DC signal from the converter circuit 110 is applied to the comparator circuit 120 and more particularly to the negative input of an op-amp U2 thereof. The positive input of the op-amp is has a reference signal or DC voltage applied thereto established in part by resistor R5 and by a variable resistor Rref. The resistor Rref may for example be coupled to a water level selection input that is adjustable by the user. The resistor R6 provides stability, and resistor R7 limits current to the output.

The output of the comparator circuit 120 changes state when the rectified input signal from across the resistive element Rs applied to the negative input of the op-amp U2 reaches some threshold established by the reference signal applied to the positive input thereof. The output of the comparator circuit 120 may be used operate some other device, for example the diode D2 in FIG. 4 or the switch 74 in FIG. 1.

Figure 5:
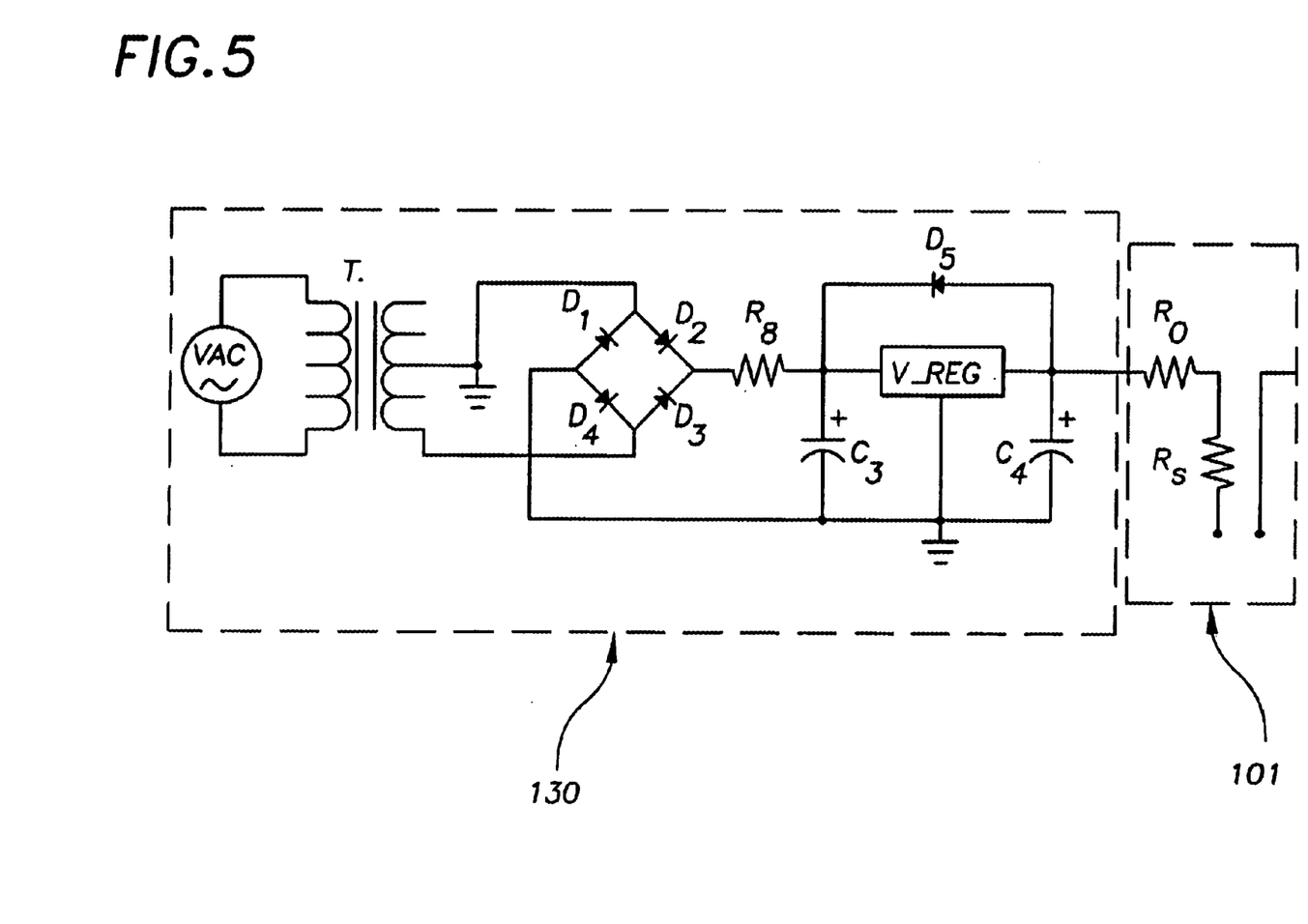
FIG. 5 is an exemplary alternative DC input circuit for a fluid level sensor.

FIG. 5 illustrates an exemplary DC input signal circuit coupled to a resistive element circuit 101, the output of which may be coupled to a control input circuit, for example the comparator circuit 120 of FIG. 4.

The exemplary resistive element circuit 101 of FIG. 5 includes a series resistor Ro, which limits current and provides the voltage divider output across the resistive element Rs. The resistive element circuit includes for example one of the exemplary resistive elements of FIGS. 2 and 3. Other alternative embodiments may include parallel resistive elements disposed in the fluid container. The resistive element Rs of the circuit preferably has a resistance that varies between the upper and lower portions thereof as discussed above.

The DC input circuit 130 comprises generally a transformer T1 that steps down the voltage, a rectifier circuit in the exemplary form of a well known diode bridge. The rectified signal is coupled by a current limiting resistor R8 and filtering capacitor C3 to a voltage regulator circuit Vreg, the output of which is coupled to the resistive element circuit 101. Other DC circuits may be used alternatively.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fluid level sensing system comprising:
a container having lower and upper portions;
a resistive element disposed in the container, the resistive element having an upper end portion disposed in the upper portion of the container and a lower end portion disposed in the lower portion of the container,
a resistance of the resistive element increases from the upper portion of the container toward the lower portion of the container,
the resistive element is a semi-conductive film strip deposited onto a non-conductive substrate, the semi-conductive film strip comprises a plurality of discrete strip portions each having a corresponding width dimension such that an output signal across the film strip varies substantially linearly with changing fluid level in the container,
a plurality of electrodes disposed thereon in spaced apart relation between the upper and lower end portions of the resistive element, each of the plurality of electrodes is coupled to a corresponding discrete portion of the resistive element;
an at least partially conductive strip disposed in the container generally parallel to the resistive element, the at least partially conductive strip and the resistive element having approximately the same length and positioned at approximately the same level as the resistive element in the container,
a series resistor having a first end portion coupled to the upper end portion of the resistive element;
an input signal source coupled to a second end portion of the series resistor.

2. The system of claim 1, first and second electrical contacts disposed in the container proximate the upper end portion of the resistive element, the first electrical contact coupled to the upper end portion of the resistive element and the second electrical contact coupled to the at least partially conductive strip.

3. The system of claim 1, the resistance of the resistive element varies continuously between the upper and lower end portions thereof.

4. The system of claim 1, a width dimension of the semi-conductive film strip has a continuously narrowing taper between upper and lower end portions thereof, upper portions of the semi-conductive film strip having a wider width dimension than lower portions thereof.

5. The system of claim 4, the input signal is an alternating voltage source.

6. The system of claim 4, the at least partially conductive strip is coupled to electrical ground, the resistive element is a single resistive element.

7. The system of claim 4, first and second electrical contacts disposed on an upper portion of the non-conductive substrate, the first electrical contact coupled to an upper end portion of the semi-conductive film strip and the second electrical contact coupled to the at least partially conductive strip, the non-conductive substrate is disposed on a side wall of the container.

8. The system of claim 1, the resistance of the resistive element varies discretely between the upper and lower end portions thereof.

9. The system of claim 1, the resistive element is electrically insulated.

10. The system of claim 9, the plurality of electrodes is a corresponding plurality of conductive film portions deposited onto the non-conductive substrate.

11. The system of claim 1, the series resistor is a second semi-conductive film strip deposited onto the substrate, the second semi-conductive film strip is electrically insulated.

12. The system of claim 1, the input signal is an alternating voltage source.

13. The system of claim 1, the at least partially conductive strip is electrically grounded, the resistive element is a single resistive element.

14. The system of claim 1, the at least partially conductive strip is electrically grounded and is a conductive film strip disposed on the non-conductive substrate.

15. The system of claim 14, first and second electrical contacts disposed on an upper portion of the non-conductive substrate, the first electrical contact coupled to an upper end portion of the semi-conductive film strip and the second electrical contact coupled to the conductive strip, the non-conductive substrate is disposed on a side wall of the container.

16. The system of claim 1, the input signal is an alternating input voltage signal.

17. The system of claim 15, a converter circuit having an input and an output, the resistive element coupled to the input of the converter circuit, a comparator circuit having a signal input, the output of the converter circuit coupled to the input of the comparator circuit.

18. The system of claim 17, the signal input is a negative input of the comparator circuit, a variable resistance is coupled to a reference input of the comparator circuit.

19. The system of claim 17, an electrically actuatable fluid flow control valve having an controlling input, an output of the comparator circuit coupled to the input of the fluid flow control valve.

20. The system of claim 19, the container is a washing machine basin.

21. A fluid level sensing resistive element comprising:
a non-conductive substrate having a first end portion and an opposite second end portion;
an electrically insulated semi-conductive film strip deposited onto the non-conductive substrate, the semi-conductive film strip having a first end portion disposed toward the first end portion of the non-conductive substrate and a second end portion disposed toward the second end portion of the non-conductive substrate,
the semi-conductive film strip having a plurality of discrete strip portions each having a corresponding width dimension, the width dimensions of discrete strip portions toward the first end portion of the non-conductive substrate are wider than the width dimensions of discrete strip portions toward the second end portion of the non-conductive substrate;
a plurality of electrodes disposed in spaced apart relation on the non-conductive substrate, each of the plurality of electrodes is coupled to a corresponding discrete strip portion.

22. The element of claim 21, each of the plurality of electrodes is a conductive film contact deposited onto the non-conductive substrate.

23. The element of claim 21, a first electrical contact disposed on the first end portion of the non-conductive substrate, the first electrical contact coupled to the first end portion of the semi-conductive film strip, an at least partially conductive film strip disposed on the non-conductive substrate generally parallel and side by side with the semi-conductive film strip, the at least partially conductive film strip at least approximately the same length as the semi-conductive film strip, a second electrical contact disposed on the first end portion of the non-conductive substrate, the second electrical contact coupled to the at least partially conductive film strip.

24. The element of claim 21, an electrically insulated second semi-conductive film strip deposited onto the substrate, a first end portion of the second semi-conductive film strip coupled to the first end portion of the semi-conductive film strip, a third electrical contact disposed on the first end portion of the non-conductive substrate, a second end portion of the second semi-conductive film strip coupled to the third electrical contact.

25. The element of claim 21, the non-conductive substrate having an adhesive surface on one side thereof.

26. A fluid level sensing resistive element comprising:
a non-conductive substrate having a first end portion and an opposite second end portion;
an electrically insulated semi-conductive film strip deposited onto the non-conductive substrate, the semi-conductive film strip having a first end portion disposed toward the first end portion of the non-conductive substrate and a second end portion disposed toward the second end portion of the non-conductive substrate,
the semi-conductive film strip having a width dimension with a continuously narrowing taper between the first and second end portions thereof, the first end portion of the semi-conductive film strip having a wider width dimension than the second end portion thereof.

27. The element of claim 26, first and second electrical contacts disposed on the first end portion of the non-conductive substrate, the first electrical contact coupled to the first end portion of the semi-conductive film strip and the second electrical contact coupled to an at least partially conductive strip disposed on the non-conductive substrate substantially parallel with the semiconductive film strip and at approximately the same level thereof.

28. A fluid level sensing system comprising:
a fluid container having a side wall with upper and lower portions,
a resistive element disposed in the container, the resistive element having an upper end portion disposed in the upper portion of the container and a lower end portion disposed in the lower portion of the container,
the resistive element is a semi-conductive film strip deposited onto a non-conductive substrate, the film strip comprises a plurality of discrete strip portions each having a corresponding width dimension, a plurality of conductive film portions deposited onto the non-conductive substrate, each conductive film portion is coupled to a corresponding discrete strip portion,
a resistance of the resistive element increases toward the lower end portion thereof and decreases toward the upper end portion thereof,
an at least partially conductive strip disposed in the container generally parallel to the resistive element, the at least partially conductive strip and the resistive element having at least approximately the same length and positioned at approximately the same level as the resistive element in the container,
an alternating input signal circuit coupled to the upper end portion of the resistive element;
a converter circuit having an input and an output, the input of the converter circuit coupled to the at least partially conductive strip,
a comparator circuit having a signal input, the output of the converter circuit coupled to the signal input of the comparator circuit.

29. The system of claim 28, first and second electrical contacts disposed in the container proximate the upper end portion of the resistive element, the first electrical contact coupled to the upper end portion of the resistive element and the second electrical contact coupled to the at least partially conductive strip.

30. The system of claim 28, the resistive element is a semi-conductive film strip deposited onto a non-conductive substrate, a width dimension of the film strip has a continuously narrowing taper between the upper and lower portions of the container.

* * * * *

UNITED STATES PATENT AND TRADEMARK OFFICE
CERTIFICATE OF CORRECTION

PATENT NO. : 6,634,229 B1
DATED : October 21, 2003
INVENTOR(S) : Kazkaz et al.

It is certified that error appears in the above-identified patent and that said Letters Patent is hereby corrected as shown below:

<u>Title page,</u>
Item [56], References Cited, U.S. PATENT DOCUMENTS, add the following reference: -- 5,923,102 Koenig et al. and DE 1133140 (German) --

<u>Drawings,</u>
Substitute the attached formal drawings for FIGS. 2 and 3 for the informal drawings printed with the original patent document.

<u>Column 11,</u>
Line 10, change the dependency thereof to claim 16 instead of claim 15.

Signed and Sealed this

Twenty-seventh Day of January, 2004

JON W. DUDAS
*Acting Director of the United States Patent and Trademark Office*

FIG.2

FIG.3